United States Patent
Sobala et al.

(10) Patent No.: US 10,761,958 B2
(45) Date of Patent: Sep. 1, 2020

(54) AUTOMATICALLY DETERMINING ACCURACY OF A PREDICTIVE MODEL

(71) Applicant: International Business Machines Corporation, Armonk, NY (US)

(72) Inventors: Wojciech Sobala, Cracow (PL); Umit M. Cakmak, Cracow (PL); Marek Oszajec, Debica (PL); Lukasz G. Cmielowski, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 281 days.

(21) Appl. No.: 15/924,746

(22) Filed: Mar. 19, 2018

(65) Prior Publication Data

US 2019/0286541 A1    Sep. 19, 2019

(51) Int. Cl.
| | |
|---|---|
| *G06F 11/34* | (2006.01) |
| *G06K 9/62* | (2006.01) |
| *G06F 11/00* | (2006.01) |
| *G06N 20/00* | (2019.01) |

(52) U.S. Cl.
CPC ........ *G06F 11/3447* (2013.01); *G06F 11/008* (2013.01); *G06K 9/6267* (2013.01); *G06N 20/00* (2019.01)

(58) Field of Classification Search
CPC .......................... G06F 11/3447; G06F 11/008
See application file for complete search history.

(56) References Cited

U.S. PATENT DOCUMENTS

| | | | |
|---|---|---|---|
| 6,954,758 B1 * | 10/2005 | O'Flaherty | G06Q 30/02 707/802 |
| 7,328,265 B2 | 2/2008 | Anstey et al. | |
| 8,417,715 B1 * | 4/2013 | Bruckhaus | G06Q 10/04 707/758 |
| 9,483,338 B2 | 11/2016 | Bhalla et al. | |
| 9,684,634 B2 | 6/2017 | Dong et al. | |

(Continued)

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pgs.

(Continued)

*Primary Examiner* — Yolanda L Wilson
(74) *Attorney, Agent, or Firm* — Gilbert Harmon, Jr.; Jared L. Montanaro

(57) ABSTRACT

A processor may acquire a trained predictive computational model from a database. The processor may apply a trained reduced complexity model to the trained predictive computational model. The trained reduced complexity model may be associated with the trained predictive computational model. The processor may select at least one metric. The processor may determine a quality indicator related to the at least one metric by identifying the type of the at least one metric, evaluating the output of the trained predictive computational model in relation to the type of the at least one metric, and generating, based on the evaluation of the trained predictive computational model, a threshold associated with the at least one metric. The processor may determine the accuracy of the trained predictive computational model based on the quality indicator.

18 Claims, 5 Drawing Sheets

(56) References Cited

U.S. PATENT DOCUMENTS

| | | | | |
|---|---|---|---|---|
| 2012/0284213 | A1* | 11/2012 | Lin | G06N 20/00 |
| | | | | 706/12 |
| 2013/0283102 | A1* | 10/2013 | Krajec | G06F 11/3636 |
| | | | | 714/38.1 |
| 2015/0039540 | A1* | 2/2015 | Dong | G06F 17/18 |
| | | | | 706/12 |
| 2015/0127595 | A1* | 5/2015 | Hawkins, II | G06N 7/005 |
| | | | | 706/46 |
| 2015/0135012 | A1* | 5/2015 | Bhalla | H04L 41/147 |
| | | | | 714/26 |
| 2016/0132373 | A1* | 5/2016 | Yoshinaga | G06F 11/34 |
| | | | | 714/28 |
| 2016/0378800 | A1 | 12/2016 | Taylor et al. | |
| 2017/0178045 | A1 | 6/2017 | Wasik et al. | |
| 2017/0262561 | A1* | 9/2017 | Yoshida | G06F 11/0766 |
| 2017/0286854 | A1* | 10/2017 | Ardis | G06F 30/20 |

OTHER PUBLICATIONS

Seliya et al., "Aggregating performance metrics for classifier evaluation," http://ieeexplore.ieee.org/document/5211611/, Information Reuse & Integration, 2009, IRI '009, IEEE International Conference on, 4 pgs.

Unknown, "Metric Aggregation," https://www.cloudera.com/documentation/enterprise/5-7-x/topics/cm_dg_metric_aggregation.html, 4 pgs., page generated Aug. 21, 2017.

* cited by examiner

AUTOMATICALLY DETERMINING ACCURACY OF A PREDICTIVE MODEL

BACKGROUND

The present disclosure relates to the field of predictive modeling, and more specifically to automatically determining the accuracy of a trained predictive computational model.

Predictive computational models are very important for making predictions about a future behavior of a system (e.g., the weather, customer's buying decisions, etc.). Based on the predictions of a model, costly measures, both computationally on the system and economically, might be prepared or taken. When the predictions of the model do not occur, there may be computationally and economically expensive negative consequences (e.g., unused hardware components, overused hardware components, etc.).

SUMMARY

Embodiments of the present disclosure include a method, system, and computer program product for automatically determining the accuracy of a trained predictive computational model. A processor may acquire a trained predictive computational model from a database. The processor may apply a trained reduced complexity model to the trained predictive computational model. The trained reduces complexity model may be associated with the trained predictive computational model. The processor may select at least one metric. The processor may determine a quality indicator related to the at least one metric by identifying the type of the at least one metric, evaluating the output of the trained predictive computational model in relation to the type of the at least one metric, and generating, based on the evaluation of the trained predictive computational model, a threshold associated with the at least one metric. The processor may determine the accuracy of the trained predictive computational model based on the quality indicator.

The above summary is not intended to describe each illustrated embodiment or every implementation of the present disclosure.

DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
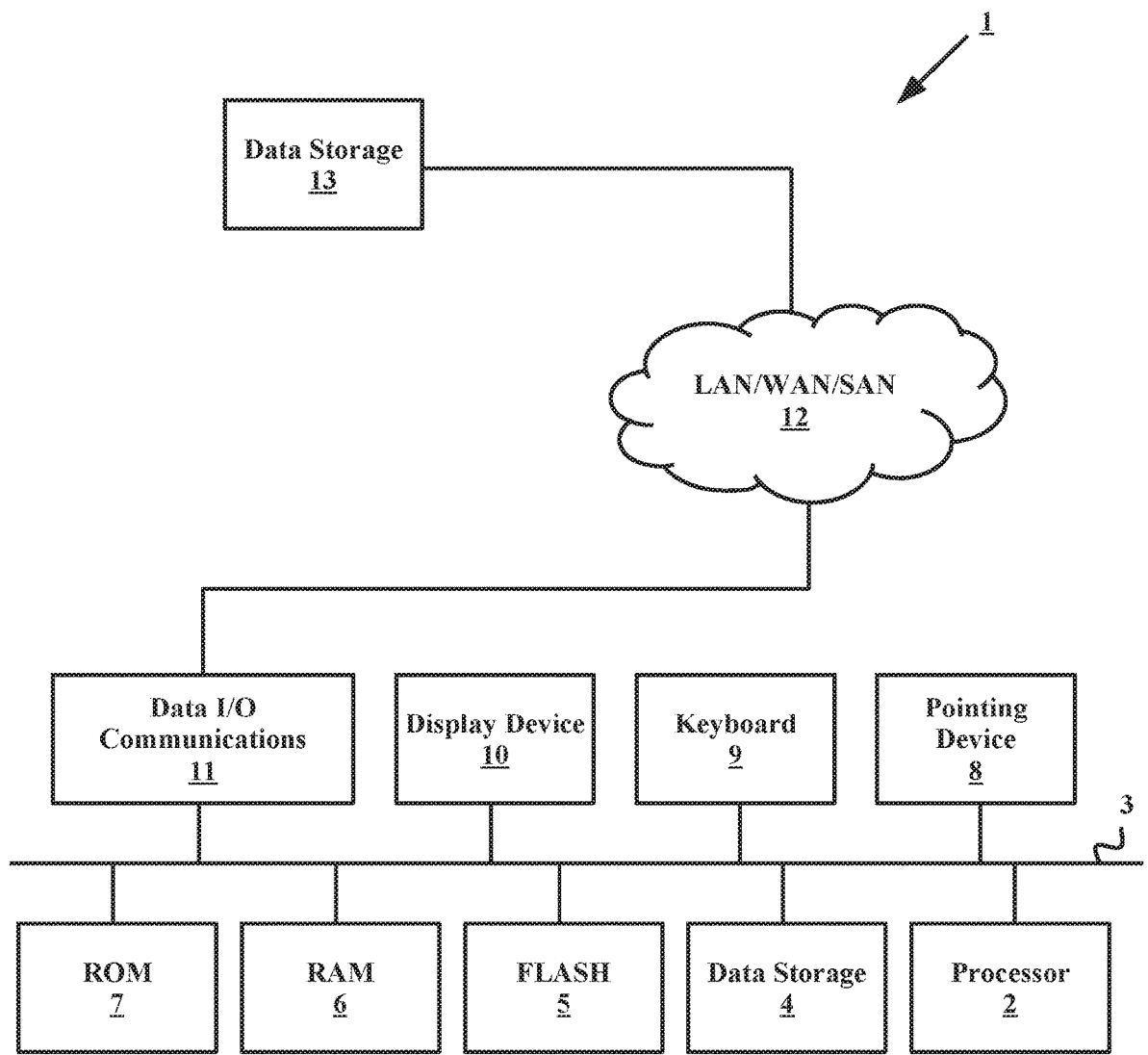
FIG. 1 illustrates a functional block diagram of an example data processing system, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of data storage, and more specifically to automatically reclaiming storage while recording media on a mobile device. While the present disclosure is not necessarily limited to such applications, various aspects of the disclosure may be appreciated through a discussion of various examples using this context.

A trained model may be evaluated in order to check its accuracy (e.g., quality, efficiency, etc.). Accuracy may be evaluated due to different criteria, such as, level of accuracy or error. In the case of the criterion of level of accuracy, the higher the evaluated value, the better. Accuracy may be measured by counting correct answers of the model and relate the number of the correct answers to the total number of answers given by the model. Error may be measured by detecting all differences of given (numerical) answers in regard to expected numerical values; a usual measure in this regard may be a root-mean-square method.

Such evaluation may be done using an evaluation model, as for example cross validation and evaluation metric, as for example accuracy or error. Definitions of the terms used herein will be given below.

Within a continuous learning loop, a data scientist may define multiple evaluation metrics (e.g., speed of learning, ratio of actual output versus predicted output, etc.). A data scientist may also define a threshold for each metric, such, that crossing the threshold, by the evaluation value, may trigger a re-training process or even a re-deployment, in order to ensure an intended quality of the model. As used herein, triggering may in particular mean: it is recommendable to perform a re-training or a re-deployment.

With several metrics and different thresholds with associated semantics (e.g., is it exceeding the threshold by the evaluation value or exceeding the evaluation value by the threshold) it may be extremely hard to track and monitor which one of the multiple metrics triggered a re-training process or even re-deployment of the model. Re-deployment of the model, as used herein, may comprise, e.g., re-setting all of the trained parameters, or, even, establishing and implementing a completely new approach for the model, or, in between, only slightly enhancing the complexity of the model.

In this regard it may be noteworthy that there may be two types of metrics: one measuring error values and a second one that measures correctness values (how close the predictive model was to an actual outcome). In case of the error concerned metric, the lower the evaluation value of the trained model, the better, in case of the accuracy concerned metric, the higher the evaluation value of the trained model the better. In other words, both metric types are associated with different directions indicating degradation. Presentation of such evaluation points in form most probable brings huge complexity to the picture and may cause confusion.

The method, system, and computer program product suggested herein intend to overcome this situation.

In one aspect, the disclosure relates to a computer-implemented method for determining a quality of a trained predictive computational model, comprising the steps of:

providing the trained predictive computational model; providing a trained reduced complexity model related to the trained predictive computational model; selecting at least one metric; determining a quality indicator related to the respective at least one metric by: evaluating the output of the trained predictive computational model, determining the type of the at least one metric, and providing a threshold associated with the selected metric; determining the quality of the trained predictive computational model based on the quality indicator.

In another aspect, the disclosure relates to a computer program product for determining a quality of a trained predictive computational model, the computer program product comprising: a computer readable storage medium having computer usable code embodied therewith, wherein the computer readable storage medium is not a transitory signal per se, the computer usable program code comprising: computer usable code configured for providing the trained predictive computational model; computer usable code configured for providing a trained reduced complexity model related to the trained predictive computational model; computer usable code configured for selecting at least one metric; computer usable code configured for determining a quality indicator related to the respective at least one metric by: evaluating the output of the trained predictive computational model, determining the type of the at least one metric, and providing a threshold associated with the selected metric; computer usable code configured for determining the quality of the trained predictive computational model based on the quality indicator.

A computer-implemented method for determining a quality of a trained predictive computational model is suggested. The method comprises providing the trained predictive computational model and providing a trained reduced complexity model related to the trained predictive computational model. Further, at least one metric is selected. Then a quality indicator related to the respective at least one metric is determined by: evaluating the output of the trained predictive computational model, determining the type of the at least one metric, and providing a threshold associated with the selected metric. Finally, the quality of the trained predictive computational model based on the quality indicator is determined.

The present method as described in more detail below may provide a computer-implemented method for determining accuracy (e.g., a quality) of a trained predictive computational model. This may have a benefit in that the determination of the accuracy of the model may be performed automatically.

A model, very generally spoken, may be an arrangement of methods and parameters for assigning a result to an input. The input may also be termed as independent variable X and the result or output may be termed as dependent variable Y. As used herein, a model may be used for making a prediction. In particular, as used herein, and for the purposes of the present disclosure, it may be sufficient define a model to be a structure of methods, instructions and parameters for establishing an output based on an input. Fields of application for a model may be weather forecast, spam filtering, predictions of user behavior, speech recognition, detection of network intruders, computer vision, etc.

A model may have a good quality, that may mean, that the model is able to make predictions that are to be evaluated as "good," or that the accuracy of the model correctly predicts the actual outcome for a situation (e.g., the model correctly mimics a real-world occurrence). If the model or the metric is of pure numerical type, the quality may be good, e.g., if the difference—or the sum of the squares—of the dependent value or dependent values calculated by the model to the real value or real values, both dependent on the same independent value, is sufficient small. If the model or the metric is of a classification type, a conformity of counts in classes as output by the model compared to the counts of classes in reality will be evaluated to be "good" the higher the conformity.

A model may be a trained model. Training or learning a model may comprise obtaining data sets comprising independent parts and corresponding dependent parts. The data sets may be divided into two groups, e.g., one group comprising training samples, e.g. a multiplicity of pairs $(X_{TRAINING}, Y_{TRAINING})$, and another group comprising test samples (e.g., data points), such as, a multiplicity of pairs $(X_{TEST}, Y_{TEST})$, wherein the members of the pairs may be real values, vectors, classes, or whatever is appropriate for the selected model.

Learning as used herein refers to machine learning that is a field of computer science that gives computers an ability to learn without being explicitly programmed. Machine learning started from pattern recognition and computational learning theory in the field of artificial intelligence. Machine learning explores the study and construction of computer implemented algorithms that can learn from and make predictions on data. Such algorithms overcome the disadvantages of static program instructions by making data-driven predictions or decisions, based on building a model from sample inputs.

Prediction as used herein may refer to a statement about an uncertain event, based on experience or knowledge.

For determining accuracy of a model, an evaluation of the trained model in regard of a selected evaluation metric may be performed. For example, data sets (e.g., test samples, data points, etc.) representing real measured values or entities, a number of training values $(X_{TRAINING}, Y_{TRAINING})$ may be taken for training purposes and another (usually smaller) number of test values $(X_{TEST}, Y_{TEST})$ may be taken for testing. What one would expect, if the trained model should be regarded as having a good accuracy/quality, that, after being trained with the training values $(X_{TRAINING}, Y_{TRAINING})$, according to all selected metrics, when being tested against the test values $(X_{TEST}, Y_{TEST})$, the trained model will yield little differences in regard of all metrics used. If the difference exceeds certain thresholds, there may arise a need to improve the model, e.g., by retraining it, for example by cross validation, as is known in the art and means, roughly spoken, exchanging the training values $(X_{TRAINING}, Y_{TRAINING})$ and test values $(X_{TEST}, Y_{TEST})$ from the data sets from the reality.

As may be understood from the above explanations, in the following, a trained predictive computational model will be due to determining its accuracy and/or quality.

The method may, thus, further comprise providing the trained predictive computational model.

The method may further comprise providing a trained reduced complexity model related to the trained predictive computational model.

The term related in "trained reduced complexity model related to the trained predictive computational model" as used herein means that both models may be trained based on the same training values $(X_{TRAINING}, Y_{TRAINING})$.

A trained reduced complexity model, also referred to as ZeroR model, is a very simple model. As used herein, the reduced complexity model may be built upon being trained by the same training values $(X_{TRAINING}, Y_{TRAINING})$ as the trained predictive computational model. The trained reduced complexity model may have a property that, when evaluating it with a specific metric, that it always yields a worse evaluation value than the trained predictive computational model.

For example, when an error-type metric is applied to the trained predictive computational model and the trained reduced complexity model, the evaluated value of the trained reduced complexity model will be larger than (e.g., worse than) the evaluated value of the trained predictive computational model.

In another example, when an accuracy-type metric is applied to the trained predictive computational model and the trained reduced complexity model, the evaluated value of the trained reduced complexity model is smaller than (e.g., again, worse than) the evaluated value of the trained predictive computational model.

This may have an advantage in that an indicator can be calculated, in a computer-implemented manner, as to which type the employed metric is.

The method may further comprise the processor selecting at least one metric. The present method may work with one metric only. An advantage is given, when several, at least two, metrics are used, because, thus, manual efforts for evaluating the automatic evaluation results may be reduced drastically.

The method may further comprise the processor determining a quality indicator related to the at least one metric. The quality indicator may comprise an evaluation value of the trained predictive computational model. The evaluation value may be calculated by evaluating the output of the trained predictive computational model. The output of the trained predictive computational model may be evaluated due to the selected metric. Further, the type of the at least one metric may be determined. As is already mentioned above and will be shown below, the type of the at least one metric may be determined by comparing the evaluated output of the trained predictive computational model to the evaluated output of the trained reduced complexity model. Further, a threshold may be provided, dependent on the metric and/or the type of metric. The above three items may be aggregated to form the quality indicator.

The method may further comprise the processor determining the quality of the trained predictive computational model based on the quality indicator. This may have an advantage in that automatically, without a need of manually analyzing involved output without knowing whether an error type metric or an accuracy type metric has been used, the quality of the trained predictive computational model may be calculated or determined. Additionally, the computational speed and hardware components of a system utilizing the method will be increased due to the automatization. That is, the system may determine the accuracy/quality of a trained predictive computational model faster than a traditional system using well-known training methods. Further the system is improved by freeing hardware elements (e.g., registers, processors, memory, etc.) that would be tied to the function of determining the accuracy had a well-known, traditional training method were used.

For example, a user may want to model the weather of a particular geographic region. The user may begin modeling the regional weather by accessing the disclosed modeling method's software on their laptop. A processor on the laptop may access the software and begin utilizing the disclosed method embedded thereon. The processor may access a database that includes climate information on the Northeast region, the Midwest region, and the Southwestern region.

The processor may prompt the user to choose which region the user wants to model. The user may choose the Southwestern region.

The processor may then choose a pre-trained model that corresponds to the Southwestern region (e.g., from other user's previous uses of the Southwestern climate model). The processor may additionally choose a second pre-trained model that corresponds to the Southwestern region and analyze both pre-trained models. The process may determine that both pre-trained models incorporate the tag (e.g., metric) associated with humidity.

The processor may then predict from the humidity tag, that the weather for the Southwestern region will be humid. The processor may compare the prediction against the information associated with the humidity tag and identify that both pre-trained models indicate that the Southwestern climate typically includes a humidity of less than 5%. The processor may identify that the prediction is incorrect because humid weather would indicate a humidity of 50% or more. The processor may choose not to relay the prediction to the user.

The processor may then re-examine the prediction and predict that the Southwestern weather will be dry, with no rain. The processor may again compare the prediction to the humidity tag and determine that the prediction is now reasonable because 5% humidity is not indicative of likely rain. The processor may then generate a graphic (e.g., a graph, a parched emoji, etc.) of the weather and display the graphic to the user. The graphic indicating to the user that the Southwestern weather is likely to be dry.

The processor may then finish the disclosed method by adding the prediction to the database as corresponding to the Southwestern region. The added prediction may improve the accuracy of subsequent predictions made about the Southwestern region and improve the user experience due to the increased likelihood of a correct prediction.

In another example, the method may be used to manufacture a ceramic. A system utilizing the method may utilize thermodynamic equations (e.g., enthalpy, heat-transfer rate, etc.) that are associated with a first predictive model. The system may then use the first predictive model to determine a predictive time for curing a ceramic material at a predictive temperature. The system may use the model to heat a kiln to the predictive temperature and then place the ceramic material in the kiln for the predictive amount of time. After the predictive amount of time, the system may remove the ceramic material and determine if the ceramic has been properly cured (e.g., by comparing the ceramic cured at the predictive temperature and time against a control ceramic material). The system may then add the result of the determination to a database that refines the first predictive model in order to increase the precision of subsequent curing of said ceramic material.

In yet another example, the trained predictive computational models may be trained in a specific manner to refine the accuracy of the models. For example, a first predictive model may use a sample mean algorithm to determine the average of data points. Then a second predictive model may use the same set of data points in to in a sample variance algorithm to determine the variance of the data points. The two predictive models may be chained together to find the deviation (e.g., square root of the variance) of the data points from the mean. The proper determination of deviation from the predictive models allowing a system to more effectively predict a reaction from the entities corresponding to the set of data points.

According to embodiments, the method may comprise the evaluation of an output of a model and/or of test samples (e.g., data points, etc.) based on the at least one metric. This may have an advantage in that results may be compared in order to determine which model has the highest accuracy and/or best quality.

According to embodiments, the method may comprise the processor determining the type of the at least one metric by comparing, based on test samples (e.g., one or more data points), the evaluated output of the trained predictive computational model to the evaluated output of the trained reduced complexity model. This may have an advantage in that then it may be known, computationally, which type the present metric is (e.g., an accuracy type metric or an error type metric). As shown above, the trained reduced complexity model may be, according to any reasonable metric, worse (e.g., of a lesser quality, less accurate) than the trained predictive computational model. Thus, upon reviewing the difference of the evaluation values of the trained reduced complexity model and the trained predictive computational model, the computer can on its own, automatically determine whether the metric employed is of an accuracy type or is of an error type.

According to embodiments, the method may comprise the processor evaluating if the output of the trained predictive computational model is larger than the output of the trained reduced complexity model, the type of the at least one metric is determined to be of an accuracy type. Additionally, the processor may evaluate if the output of the trained predictive computational model is smaller than the output of the trained reduced complexity model, the type of the at least one metric is determined to be of an error type.

According to embodiments, the method may comprise the processor determining the quality of the trained predictive computational model by the processor judging the quality to be insufficient, if, according to the at least one metric, the quality indicator does not correspond to a threshold condition. This may have an advantage in that the computer or the processor may automatically prompt the user and/or automatically initiate a re-training or re-deployment of the model. Thus, the user or operator may be relieved from tedious daily routine work.

According to embodiments, the method, the at least one metric may not correspond to the threshold condition. The at least one metric may not correspond to the threshold condition if the metric is of an accuracy type and/or if the evaluated output of the trained predictive computational model is smaller than the threshold associated with the metric. Additionally, if the at least one metric does correspond to the threshold condition, the metric is of an error type and/or the evaluated output of the trained predictive computational model is larger than the threshold associated with the metric. This may have an advantage in that reproducible evaluation results may be enabled.

According to embodiments, the method may further comprise the processor determining the quality of the trained predictive computational model by judging the quality to be sufficient, if according to all applied metrics, the quality indicator corresponds to a threshold condition. This may have an advantage in that, if cumulatively all quality indicators or aggregated quality indicators indicate a good quality (e.g., the trained predictive computational model is of an acceptable accuracy, such as above a threshold of 70% accurate), the only value that may be prompted to the user may be an indicator of the type "quality is OK", so that the user does not need to pay too much attention on analyzing all the results and quality indicators calculated in the evaluation procedure or evaluations procedures.

According to embodiments, the quality indicator does not correspond to the threshold condition if the metric is of an accuracy type metric, the accuracy type metric may be indicated by the evaluated output of the trained predictive computational model being larger than or equal to the threshold associated with the metric. In other embodiments, the quality indicator does not correspond to the threshold condition if the metric is of an error type metric, the error type metric may be indicated by that the evaluated output of the trained predictive computational model being smaller than or equal to the threshold associated with the metric.

According to embodiments, the method may further comprise the processor aggregating the quality indicators of all used metrics. Thus, an aggregation of aggregated evaluation-related values may be achieved. This may have an advantage in that the user may gain an overview of all quality indicators, which may be important if there were more than one quality indicator indicating insufficient quality of the trained predictive computational model.

According to embodiments, the method may further comprise the processor arranging the quality indicators over all used metrics in a manner, wherein a quality indicator indicating non-sufficient quality is arranged on top of all of the arranged quality indicators (e.g., the quality indicators are placed in a ranked list, with the least accurate quality indicator listed first and the most accurate quality indicator listed last). This may have an advantage in that the user may see on first sight, according to which one of the used metrics a low quality has been determined.

To summarize, abstractly, a computer-implemented method for determining a quality of a trained predictive computational model is suggested. The method comprises steps as providing the trained predictive computational model and providing a trained reduced complexity model related to the trained predictive computational model. Further, at least one metric is selected. Then a quality indicator related to the respective at least one metric is determined by: evaluating the output of the trained predictive computational model, determining the type of the at least one metric, and providing a threshold associated with the selected metric. Finally, the quality of the trained predictive computational model based on the quality indicator is determined.

According to an aspect, a computer program product for determining a quality of a trained predictive computational model is envisaged. An advantage, in addition to the advantage of the method as set forth above, might be, that a computer program product may be provided to many companies offering benefits to those companies.

The computer program may comprise: a non-transitory computer readable storage medium having computer usable code embodied therewith, wherein the computer readable storage medium is not a transitory signal per se, the computer usable program code comprising: computer usable code configured for performing one or more of the steps as already set forth upon describing the above method bearing the same advantages, that are, thus not repeated here.

To summarize, a computer-implemented method and corresponding computer program product for aggregating results from multiple evaluation metrics is described herein. In other words, herein is proposed, how to detect a type of a metric automatically, in particular in regard of the direction of degradation. Further, aggregating of all metric values is proposed, the aggregating performed in a manner, that a user observes only one in time that may be most critical for him. Critical as used herein may in particular mean a scenario, wherein a re-training of the trained model or even a re-deployment of the model may be recommendable. The presentation of the evaluating results in an aggregated manner may have an advantage in that the different evaluation results may be presented in the same manner, independent from describing error or accuracy. The aggregated metric values may be termed as quality indicator.

In other words, a computer-implemented method and corresponding computer program product for aggregating evaluation metrics for training a model are described herein.

The method may comprise one or more of the following steps: for each metric determining whether it represents a correctness value or an error value, by training a real model, generating a performance with a first quality (e.g., a first accuracy), determining the metric value for said real model, training a dummy model, e.g. a ZeroR model, generating a lower quality than said first quality (a worse/lower, second accuracy than the first accuracy), determining the metric value for said dummy model, if said metric value for said dummy model is lower than said metric value for said real model, classifying said metric as a correctness value, otherwise classifying said metric as an error value.

The method further comprise aggregating said metrics, wherein all error value metrics are assigned a first sign, and wherein all correctness value metrics are assigned a second sign which is opposite the first sign.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Additionally, it is noted, that certain embodiments herein may offer various technical computing advantages, involving computing advantages to address problems arising in the realm of computer technology. Automatic accuracy detection technologies aim to observe one or more real-world models and take action that maximizes a likelihood of successful predictive replication. Embodiments herein employ such technologies that may include machine learning to replace flawed subjective decision-making characterizing user behavior. Embodiments herein can replace and improve upon human cognitive decision-making process by the removal of such subjective elements. In one aspect embodiment herein, a processor can provide decisions incapable of being provided by humans by the removal of subjective elements.

In some embodiments, trained predictive computational models trained from previous models can be employed to model user behavior (e.g., activities involving work by workers, weather forecasts, etc.). Data specifying known past historical occurrences can be applied as training data to parameterize the trained predictive computational models, and models can be solved by machine learning for objective learning of a user's behavior. Values learned by model solving can be used to provide one or more output, including one or more output to activate one or more process. Learned model processing can be used to discern the accuracy of one trained predictive computational model over another. Machine learning processes, e.g., involving use of models and updating decision data structures can be performed for increased accuracy and for reduction of reliance on rules-based criteria and thus reduced computational overhead. Machine learning processes can be iterated using updated training data for improved accuracy and other performance parameters over time.

A block diagram illustrating an example computer processing system adapted to implement the methods of the present disclosure is shown in FIG. 1. The computer system 1, comprises a processor 2, which may comprise a digital signal processor (DSP), central processing unit (CPU), microcontroller, microprocessor, microcomputer, ASIC or FPGA core. The system also comprises static read only memory (ROM) 7 and random-access memory (RAM) 6 and may also comprise a FLASH memory 5. The processor 2 is via a bus 3 in communication with any of said memory devices as well as with peripheral devices such as a display device 10, a keyboard 9, a pointing device 8, such as, e.g., a mouse or a tablet.

The computer system is connected to one or more external networks such as a LAN or WAN or SAN 12 via communications lines connected to the system via one or more data I/O communication interfaces 11, e.g. a network interface. Network adapters coupled to the system enable the data processing system to become coupled to other data processing systems or remote printers or storage devices through intervening public or private networks.

For example, in embodiments, a first computer that may be arranged as the data processing system as described with respect to FIG. 1, and a corporate data processing system that may be arranged as the data processing system as described with respect to FIG. 1 may be connected to each other so that the first computer can gain insight into the corporate data processing system. The corporate data processing system itself may be established by a multiplicity of second computers communicatively coupled to each other, each arranged as the data processing system as described with respect to FIG. 1, cooperating with one or more databases.

Modem, cable modem and Ethernet cards are just a few of the currently available types of network adapters. The system comprises also a magnetic or semiconductor based data storage or storage device 4 and/or 13 for storing application programs and data. The system comprises computer readable storage medium that may include any suitable memory means, including but not limited to, magnetic storage, optical storage, semiconductor volatile or non-volatile memory or any other memory storage device.

In an exemplary embodiment it is envisaged that the computer system that the user uses to communicate with the computer system that executes the method of present disclosure is a client computer system as depicted above. In another exemplary embodiment it is envisaged that the computer system that executes the method of present disclosure essentially is structured comparable, however, in detail, is structured as illustrated below.

Figure 2:
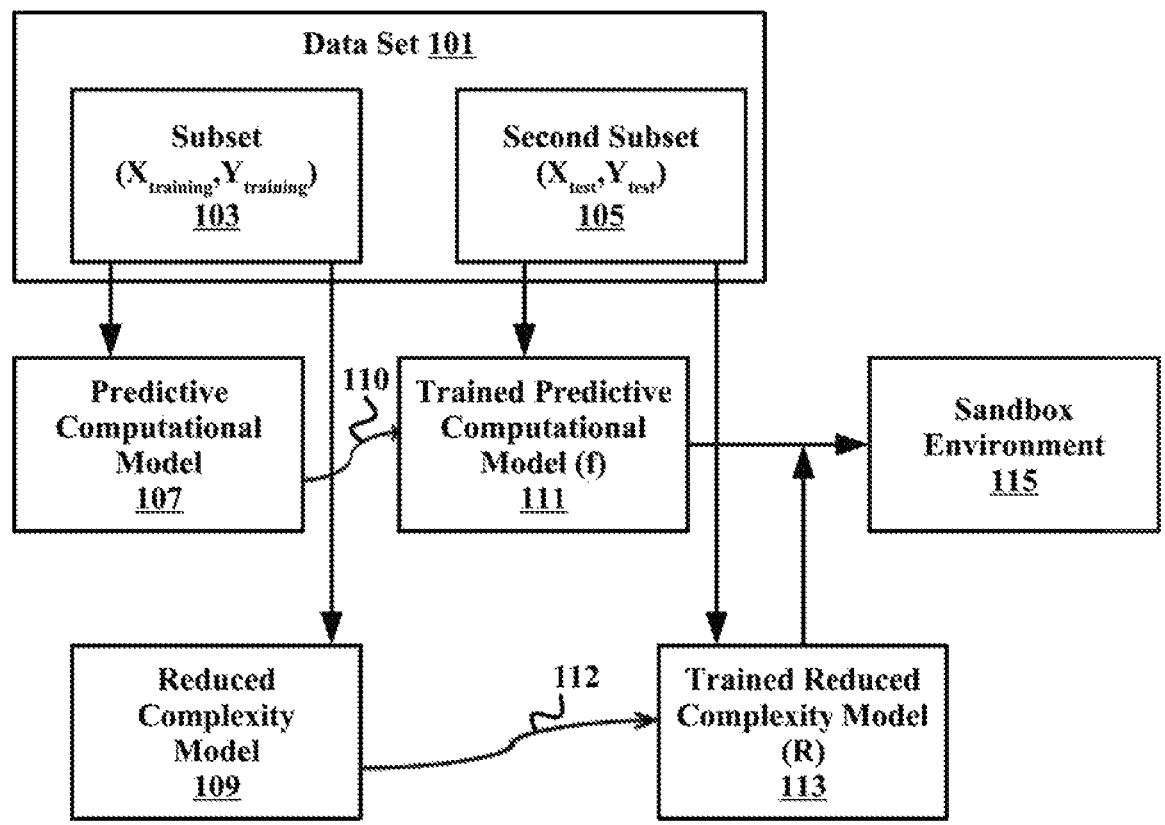
FIG. 2 illustrates a functional block diagram of how a type of a metric may be determined, in accordance with embodiments of the present disclosure.

FIG. 2 illustrates how a type of a metric may be determined in an architecture 100, in accordance with embodiments of the present disclosure.

A data set 101 of measured data (X, Y) from reality (e.g., historical data from a real-world environment) may be provided. A subset 103 may be selected from the data set 101 for purposes of training a predictive computational model 111, the subset 103 being also denoted as ($X_{training}$, $Y_{training}$). Another, second subset 105 may be selected from the data set 101 for purposes of evaluating a trained model that is trained based upon data from the subset 103.

A predictive computational model 107 to be trained receives its training input ($X_{training}$, $Y_{training}$).

Upon being presented the training input, ($X_{training}$, $Y_{training}$), the predictive computational model 107 will learn. When the training is finished, finally, the predictive computational model 107 will turn, via transition 110, into a trained predictive computational model 111, designated also by "f". According to one of a multiplicity of possible metrics, the quality of the trained predictive computational model 111 may, e.g., be evaluated by observing the differences based on the test data ($X_{test}$, $Y_{test}$) of the second subset 105: diff:=f($X_{test}$)−$Y_{test}$ for all test data.

Additionally, a reduced complexity model 109 may be trained by receiving, e.g., the same training input ($X_{training}$, $Y_{training}$) of subset 103. The reduced complexity model has the property that it evaluates worse than the related predictive computational model 107. When the training of the reduced complexity model 109 is finished, it will turn, via second transition 112, into a trained reduced complexity model 113, also designated as R in the FIG. 2.

For evaluating the trained predictive computational model 111, both the trained predictive computational model 111 and the trained reduced complexity model 113 will be tested individually by receiving the test data ($X_{test}$, $Y_{test}$) of the second subset 105, the testing being performed in a sandbox environment 115. The testing in the sandbox environment 115 performs a method for determining a quality of a trained predictive computational model, as will be explained in more detail below, evaluates the trained predictive computational model 111 and evaluates the trained reduced complexity model 113; based on the results, quality indicators will be determined, indicating as to whether a re-training or even re-deployment of the trained predictive computational model 111 may seem recommendable.

Figure 3:
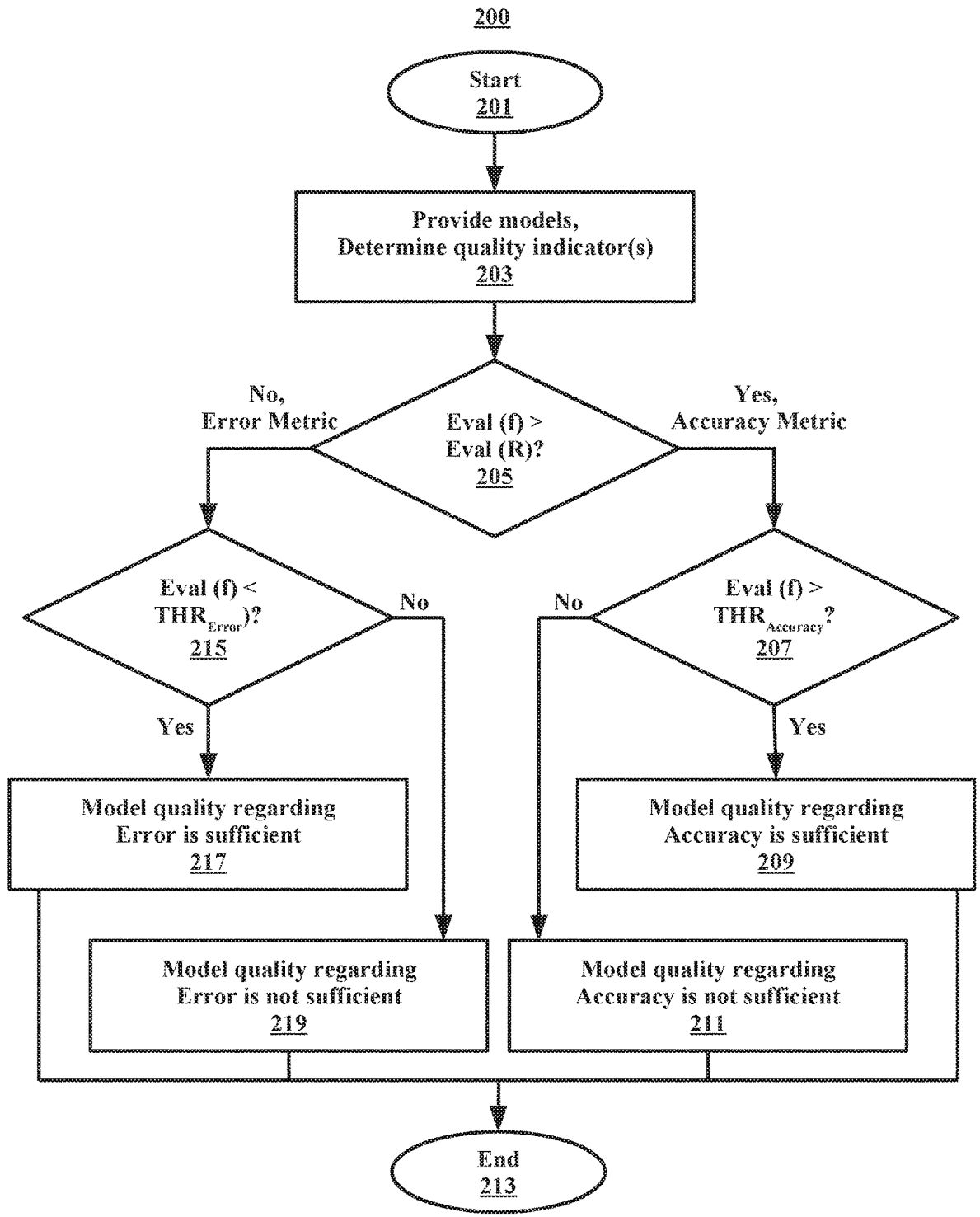
FIG. 3 illustrates a flowchart of an example method for determining accuracy of a trained predictive computational model, in accordance with embodiments of the present disclosure.

FIG. 3 illustrates a method 200 for determining a quality of a trained predictive computational model, in accordance with embodiments of the present disclosure.

The method 200 starts at a start operation 201 and refers to the above disclosure concerning FIG. 2. After starting at the starting operation 201, the method 200 may proceed to operation 203, a trained predictive computational model 111 may be provided. Further, a trained reduced complexity model 113 may be provided. Using data, e.g., test data 105, both trained models may be evaluated, yielding Eval(f) denoting the evaluation value of the trained predictive computational model 111 and Eval(R) denoting the evaluation value of the trained reduced complexity model 113. Based thereupon, the method 200 may proceed from operation 203 to decision block 205, where the quality indicators may be determined, by the evaluated output of the trained predictive computational model, a determined type of the used metric, and a provided threshold associated with the selected metric.

The type of the used metric may be determined by comparing Eval(f) with Eval(R). As the trained reduced complexity model, by design, may be of lower quality than the trained predictive computational model, in decision block 205, in the case Eval(f) is larger than Eval(R), it may be decided that the metric is of accuracy type. On the other hand, if Eval(f) is smaller than Eval(R), it may be decided that the metric is of error type.

After decision block 205, the method 200 may proceed to decision block 207, where it is checked as to whether the evaluation value Eval(f) of the trained predictive computational model 111 is larger than, or at least equal, to an accuracy threshold $THR_{Accuracy}$. If this is the case, which means the method 200 may proceed to operation 209 and that the accuracy of the trained predictive computational model is better than prescribed, it will be regarded that the quality of the trained predictive computational model is regarded sufficient, with regard to the actual metric. If this is not the case, the method 200 may proceed to operation 211, where the quality of the trained predictive computational model will be regarded to be insufficient. The method, in this loop, ends at end operation 213.

In some embodiments, if the trained predictive computational model is regarded as insufficient at operation 211, the processor may improve the accuracy of the trained predictive computational model by adjusting the determine quality indicators, as described in operation 203. The processor may continually adjust the quality indicators until the trained predictive computational model is regarded as sufficient, as described in operation 209. Continually adjusting the quality indicators to improve the accuracy or the trained predictive computational model improves the overall performance of the system operating the method 200 because the system, using the processor, is able to more quickly determine applicable models for a given scenario by knowing which models with which quality indicator combinations are insufficient (e.g., not accurate). Thus, hardware (e.g., other processors, registers, memory, etc.) in the system is freed from having to evaluate the accuracy of subsequent trained predictive computational models. Additionally, with the freed hardware, the system is able to processes subsequent trained predictive computational models faster and with a higher valuation value Eval(f) of a trained predictive computational model.

If, at decision block 205, the metric is determined to be of error type, the method 200 will continue to decision block 215, where it will be checked as to whether the evaluation Eval(R) of the trained predictive computational model 111 is smaller than an error threshold $THR_{Error}$. If this is the case, the method 200 may proceed to operation 217, which means that the error of the trained predictive computational model is smaller than prescribed, it will be regarded that the quality of the trained predictive computational model is regarded sufficient, with regard to the actual metric. If this is not the case, the method 200 may proceed to operation 219, where the quality of the trained predictive computational model will be regarded to be insufficient. The method, in this loop, ends again at end operation 213.

If, for all available metrics, the respective quality indicators of the trained predictive computational model are regarded to be sufficient, the quality of the trained predictive computational model may be regarded to be sufficient, too.

If, on the other hand, only one quality indicator of the trained predictive computational model is regarded to be insufficient (e.g., inaccurate and inoperable for predictive purposes), or not sufficient, the quality indicators, that comprise in an aggregated manner the evaluation value of the trained predictive computational model, the type of the determined metric, and the threshold related to the metric, will be presented to the user, so that he can take the necessary measures, as for, e.g., initiate a re-learning of the models, initiate a re-deployment, or only making a note, if, e.g., the threshold is only slightly violated.

The skilled person will appreciate that, in decision block 205, alternatively, a difference of the related threshold minus the trained predictive computational model's evaluation value may be multiplied with (−1) in the case the metric type is measuring accuracy: In that case, only one branch will be necessary instead of the two branches to decision blocks 215 and 207.

In the following, examples of quality identifiers, i.e., aggregated values concerning a trained predictive computational model with regard to a metric, are given:

Example 1: None of metrics degrades or violates thresholds (positive case): {"name": "accuracy", "value": 0.91, "threshold": 0.9}, {"name": "MeanSquareError","value": 0.2, "threshold": 0.25}.

This means that a trained predictive computational model is evaluated to have an evaluation value of 0.91 with regard to an accuracy type metric. The threshold relating accuracy, here, is 0.9. As the evaluation value is larger than the threshold, according this quality identifier, the trained predictive computational model corresponds to a given quality concerning the accuracy type metric.

Or, more computational: Differences of diff:=(threshold−value) are: {"name": "accuracy", "diff": (−1)*(0.9−0.91)= 0.01} and {"name": "MeanSquareError", "diff": 0.25− 0.2=0.05}.

Example 2: Error metric degrades threshold (case that should trigger action): {"name": "accuracy", "value": 0.91, "threshold": 0.9}, {"name": "MeanSquareError", "value": 0.3, "threshold": 0.25}.

In this case, differences are: {"name": "accuracy", "diff": 0.01} and {"name": "MeanSquareError", "diff": −0.05}.

As is apparent at first sight, the diff value for the MeanSquareError type metric is negative. This should trigger alarms and planned actions (e.g., an alert may be displayed to a user, an alarm may system may be activated, etc.). It basically means that the quality of the trained predictive computational model is below a prescribed threshold.

Next phase: Ranking of aggregated records—the critical ones on top: {"name": "MeanSquareError", "diff": −0.05}, {"name": "accuracy", "diff": 0.01}.

As can be seen in this example, the quality indicators over all used metrics are arranged in a manner, wherein a quality indicator indicating non-sufficient quality is arranged on top of all of the arranged quality indicators.

Thus, a user can easily see, where the alarm comes from. He thus can evaluate as to whether this violation of a threshold is to be judged as really critical and take appropriate actions. For example, if the difference is only very small, it might be not appropriate to take an action. If the difference is really big, it might be necessary to completely re-think the design of the predictive computational model. And, in a medium severe case, it might be sufficient to re-train the predictive computational model.

The descriptions of the various embodiments of the present disclosure have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The terminology used herein is for the purpose of describing particular embodiments only and is not intended to limit the disclosure. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present disclosure has been presented for purposes of illustration and description, but is not intended to be exhaustive or limited to the disclosure in the form disclosed. Many modifications and variations will be apparent to those of ordinary skills in the art without departing from the scope and spirit of the disclosure. The embodiments are chosen and described in order to best explain the principles of the disclosure and the practical application, and to enable others of ordinary skills in the art to understand the disclosure for various embodiments with various modifications, as are suited to the particular use contemplated.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
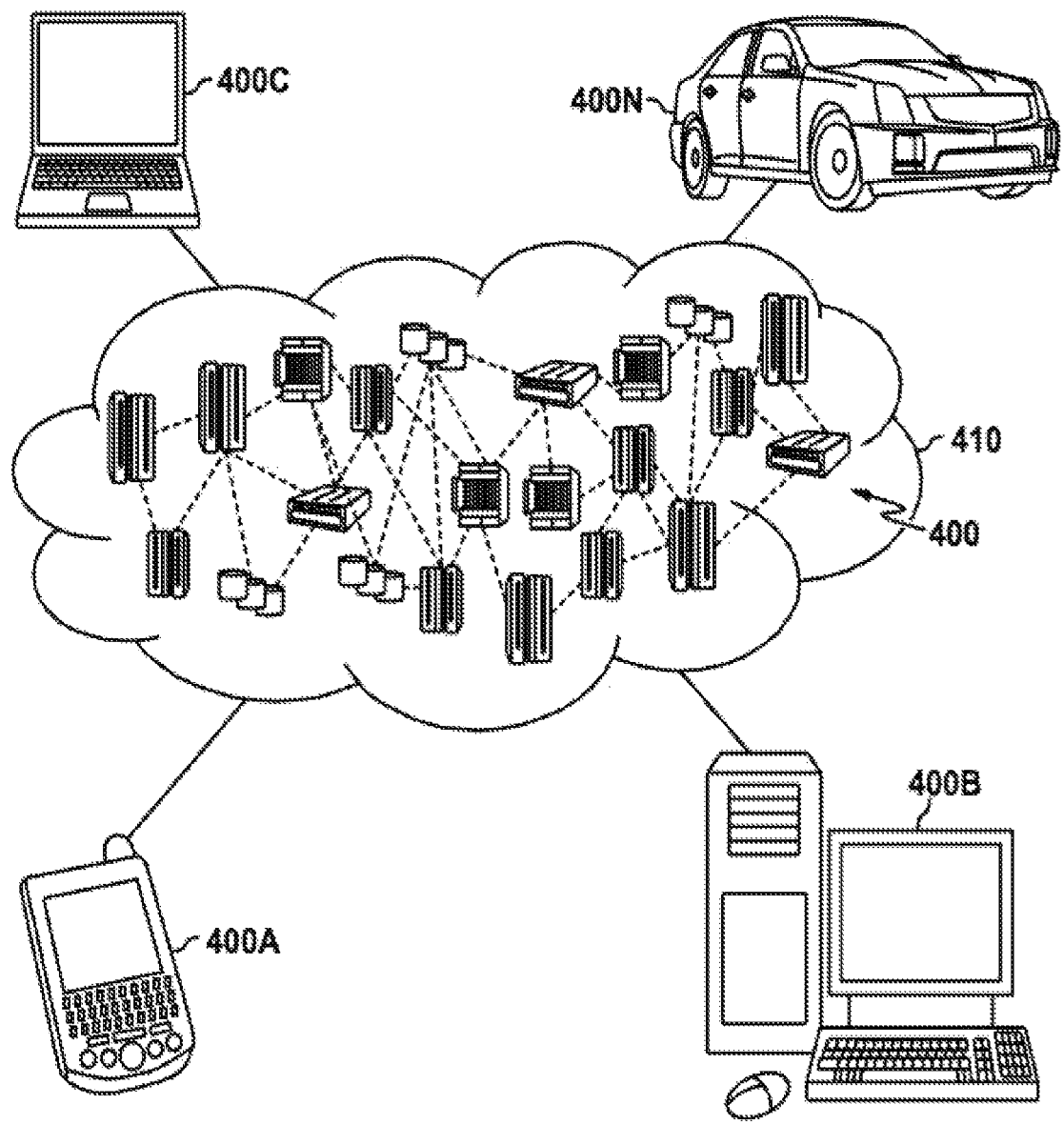
FIG. 4 depicts a cloud computing environment, in accordance with embodiments of the present disclosure.

Referring now to FIG. 4, illustrative cloud computing environment 410 is depicted. As shown, cloud computing environment 410 includes one or more cloud computing nodes 400 with which local computing devices used by cloud consumers, such as, for example, personal digital assistant (PDA) or cellular telephone 400A, desktop computer 400B, laptop computer 400C, and/or automobile computer system 400N may communicate. Nodes 400 may communicate with one another. They may be grouped (not shown) physically or virtually, in one or more networks, such as Private, Community, Public, or Hybrid clouds as described hereinabove, or a combination thereof.

This allows cloud computing environment 410 to offer infrastructure, platforms and/or software as services for which a cloud consumer does not need to maintain resources on a local computing device. It is understood that the types of computing devices 400A-N shown in FIG. 4 are intended to be illustrative only and that computing nodes 400 and cloud computing environment 410 can communicate with any type of computerized device over any type of network and/or network addressable connection (e.g., using a web browser).

Figure 5:
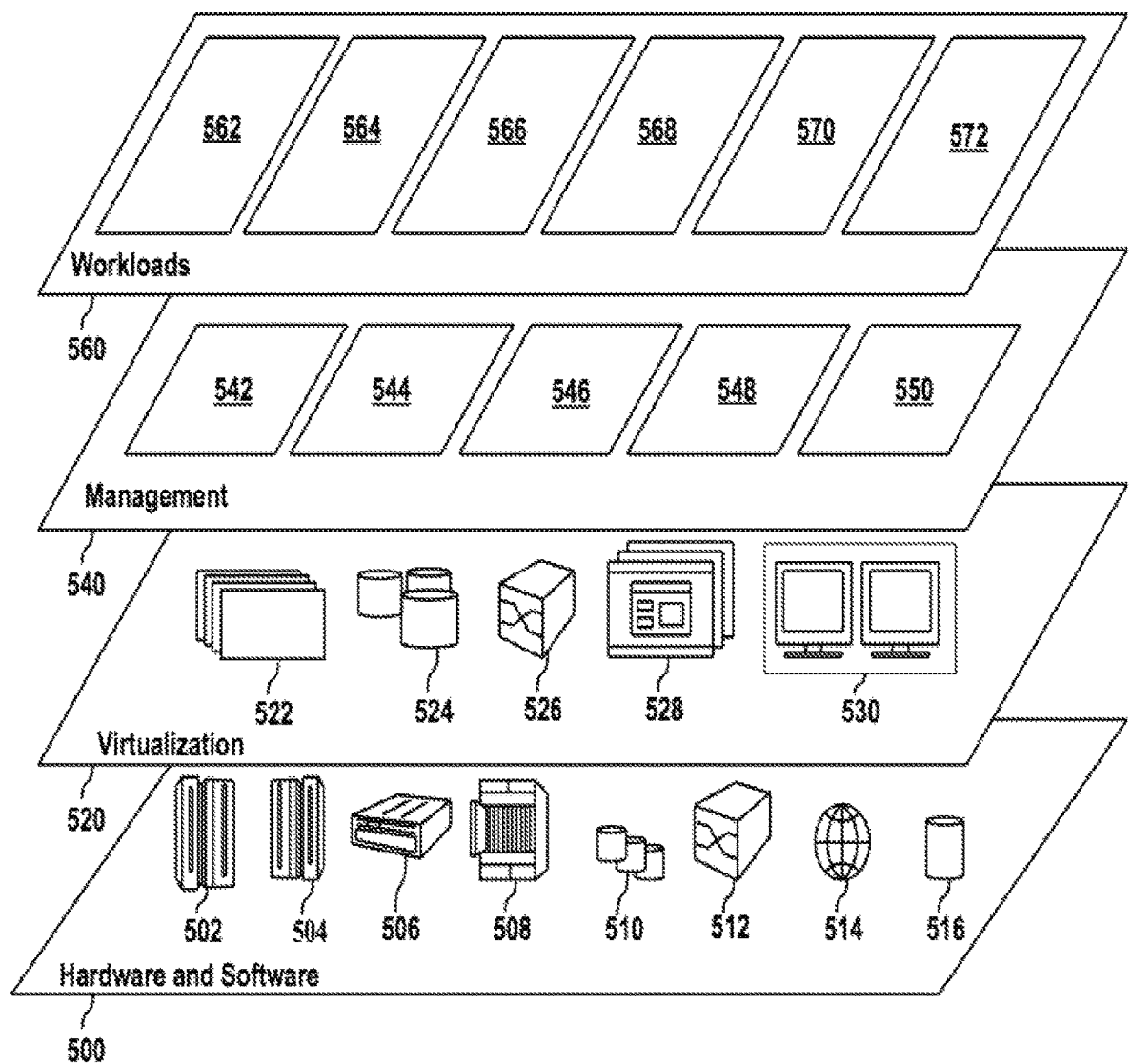
FIG. 5 depicts abstraction model layers, in accordance with embodiments of the present disclosure.

Referring now to FIG. 5, a set of functional abstraction layers provided by cloud computing environment 410 (FIG. 4) is shown. It should be understood in advance that the components, layers, and functions shown in FIG. 5 are intended to be illustrative only and embodiments of the disclosure are not limited thereto. As depicted below, the following layers and corresponding functions are provided.

Hardware and software layer 500 includes hardware and software components. Examples of hardware components include: mainframes 502; RISC (Reduced Instruction Set Computer) architecture based servers 504; servers 506; blade servers 508; storage devices 510; and networks and networking components 512. In some embodiments, software components include network application server software 514 and database software 516.

Virtualization layer 520 provides an abstraction layer from which the following examples of virtual entities may be provided: virtual servers 522; virtual storage 524; virtual networks 526, including virtual private networks; virtual applications and operating systems 528; and virtual clients 530.

In one example, management layer 540 may provide the functions described below. Resource provisioning 542 provides dynamic procurement of computing resources and other resources that are utilized to perform tasks within the cloud computing environment. Metering and Pricing 544 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 546 provides access to the cloud computing environment for consumers and system administrators. Service level management 548 provides cloud computing resource allocation and management such that required service levels are met. Service Level Agreement (SLA) planning and fulfillment 550 provide pre-arrangement for, and procurement of, cloud computing resources for which a future requirement is anticipated in accordance with an SLA.

Workloads layer 560 provides examples of functionality for which the cloud computing environment may be utilized. Examples of workloads and functions which may be provided from this layer include: mapping and navigation 562; software development and lifecycle management 564; virtual classroom education delivery 566; data analytics processing 568; transaction processing 570; and automatically determining the accuracy of a trained predictive computational model 572.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

The invention claimed is:

1. A computer-implemented method for determining accuracy of a trained predictive computational model, comprising:
   acquiring, by a processor, the trained predictive computational model from a database;
   applying a trained reduced complexity model to data used to train the trained predictive computational model, wherein the trained reduced complexity model is associated with the trained predictive computational model;
   selecting at least one metric;

determining a quality indicator related to the at least one metric by:
  identifying the type of the at least one metric by comparing, based on one or more data points, the evaluated output of the trained predictive computational model to an evaluated output of the trained reduced complexity model,
  evaluating the output of the trained predictive computational model in relation to the type of the at least one metric, and
  generating, based on the evaluation of the trained predictive computational model, a threshold associated with the at least one metric; and
determining the accuracy of the trained predictive computational model based on the quality indicator.

2. The method of claim 1, wherein the evaluation of an output of the trained predictive computational model is based on the at least one metric being an evaluation metric.

3. The method of claim 1, wherein the evaluated output of the trained predictive computational model is larger than the evaluated output of the trained reduced complexity model when the type of the at least one metric is identified as an accuracy type metric.

4. The method of claim 1, wherein the evaluated output of the trained predictive computational model is smaller than the evaluated output of the trained reduced complexity model when the type of the at least one metric is identified as an error type metric.

5. The method of claim 1, wherein determining the accuracy of the trained predictive computational model further comprises:
  identifying, according to the at least one metric, that the quality indicator does not correspond to a threshold condition; and
  classifying the accuracy of the trained predictive computational model to be insufficient, wherein classifying the trained predictive computational model as insufficient flags the trained predictive computational model as unusable for display to a user.

6. The method of claim 5, wherein the quality indicator does not correspond to the threshold condition when the at least one metric is an accuracy type metric, wherein the accuracy type metric is indicated by the evaluated output of the trained predictive computational model being smaller than the threshold associated with the at least one metric.

7. The method of claim 5, wherein the quality indicator does not correspond to the threshold condition when the at least one metric is an error type metric, wherein the error type metric is indicated by the evaluated output of the trained predictive computational model being larger than the threshold associated with the at least one metric.

8. The method of claim 1, wherein determining the accuracy of the trained predictive computational model comprises:
  identifying the accuracy of the trained predictive computational model to be sufficient, wherein the accuracy of the trained predictive computational model is sufficient when the quality indicator corresponds to a threshold condition that is based on the at least one metric.

9. The method of claim 8, wherein the quality indicator corresponds to the threshold condition when the at least one metric is an accuracy type metric, wherein the accuracy type metric is indicated by the evaluated output of the trained predictive computational model being larger than the threshold associated with the at least one metric.

10. The method of claim 8, wherein the quality indicator corresponds to the threshold condition when the at least one metric is an error type metric, wherein the error type metric is indicated by the evaluated output of the trained predictive computational model being smaller than the threshold associated with the at least one metric.

11. A computer program product for determining accuracy of a trained predictive computational model, the computer program product comprising:
a non-transitory computer readable storage medium having program instructions embodied therewith, the program instructions executable by a processor to cause the processor to perform a method, the method comprising:
  acquiring, by the processor, the trained predictive computational model from a database;
  applying a trained reduced complexity model to data used to train the trained predictive computational model, wherein the trained reduced complexity model is associated with the trained predictive computational model;
  selecting at least one metric;
  determining a quality indicator related to the at least one metric by:
    identifying the type of the at least one metric by comparing, based on one or more data points, the evaluated output of the trained predictive computational model to an evaluated output of the trained reduced complexity model,
    evaluating the output of the trained predictive computational model in relation to the type of the at least one metric, and
    generating, based on the evaluation of the trained predictive computational model, a threshold associated with the at least one metric; and
  determining the accuracy of the trained predictive computational model based on the quality indicator.

12. The computer program product of claim 11, wherein the evaluated output of the trained predictive computational model is larger than the evaluated output of the trained reduced complexity model when the type of the at least one metric is identified as an accuracy type metric.

13. The computer program product of claim 11, wherein the evaluated output of the trained predictive computational model is smaller than the evaluated output of the trained reduced complexity model when the type of the at least one metric is identified as an error type metric.

14. The computer program product of claim 11, wherein determining the accuracy of the trained predictive computational model further comprises:
  identifying, according to the at least one metric, that the quality indicator does not correspond to a threshold condition; and
  classifying the accuracy of the trained predictive computational model to be insufficient, wherein classifying the trained predictive computational model as insufficient flags the trained predictive computational model as unusable for display to a user.

15. A system for determining accuracy of a trained predictive computational model, the system comprising:
  a memory; and
  a processor in communication with the memory, the processor being configured to perform operations comprising:
    acquiring, by the processor, the trained predictive computational model from a database;
    applying a trained reduced complexity model to data used to train the trained predictive computational model, wherein the trained reduced complexity model is associated with the trained predictive computational model;

selecting at least one metric;
determining a quality indicator related to the at least one metric by:
  identifying the type of the at least one metric by comparing, based on one or more data points, the evaluated output of the trained predictive computational model to an evaluated output of the trained reduced complexity model,
  evaluating the output of the trained predictive computational model in relation to the type of the at least one metric, and
  generating, based on the evaluation of the trained predictive computational model, a threshold associated with the at least one metric; and
determining the accuracy of the trained predictive computational model based on the quality indicator.

16. The system of claim 15, wherein determining the accuracy of the trained predictive computational model comprises:

identifying the accuracy of the trained predictive computational model to be sufficient, wherein the accuracy of the trained predictive computational model is sufficient when the quality indicator corresponds to a threshold condition that is based on the at least one metric.

17. The system of claim 16, wherein the quality indicator corresponds to the threshold condition when the at least one metric is an accuracy type metric, wherein the accuracy type metric is indicated by the evaluated output of the trained predictive computational model being larger than the threshold associated with the at least one metric.

18. The system of claim 16, wherein the quality indicator corresponds to the threshold condition when the at least one metric is an error type metric, wherein the error type metric is indicated by the evaluated output of the trained predictive computational model being smaller than the threshold associated with the at least one metric.

* * * * *